United States Patent
Roberts et al.

(10) Patent No.: US 6,587,189 B1
(45) Date of Patent: Jul. 1, 2003

(54) ROBUST INCOHERENT FIBER OPTIC BUNDLE DECODER

(75) Inventors: Hilary E. Roberts, Huntsville, AL (US); Charles P. DePlachett, Madison, AL (US); Brent E. Deason, Huntsville, AL (US); Robert A. Pilgrim, Benton, KY (US); Harold S. Sanford, Richmond, TN (US)

(73) Assignee: SRS Technologies, Huntsville, AL (US)

( * ) Notice: Subject to any disclaimer, the term of this patent is extended or adjusted under 35 U.S.C. 154(b) by 0 days.

(21) Appl. No.: 09/450,216

(22) Filed: Nov. 29, 1999

(51) Int. Cl.[7] ............................................... G01N 21/00
(52) U.S. Cl. ..................................................... 356/73.1
(58) Field of Search ........................ 356/73.1; 385/115, 385/116, 117, 119, 120

(56) References Cited

U.S. PATENT DOCUMENTS

| | | |
|---|---|---|
| 4,760,421 A | 7/1988 | Margolin |
| 4,762,391 A | 8/1988 | Margolin |
| 4,812,646 A | 3/1989 | Waszkiewicz |
| 5,011,261 A | 4/1991 | Gordon |
| 5,166,927 A | 11/1992 | Iida et al. |
| 5,327,514 A | 7/1994 | Dujon et al. |
| 5,515,470 A | 5/1996 | Eikelmann et al. |
| 5,557,693 A * | 9/1996 | Stevens et al. ............... 385/24 |
| 5,696,858 A * | 12/1997 | Blake ........................... 385/12 |
| 6,190,308 B1 * | 2/2001 | Irion et al. .................. 600/109 |

FOREIGN PATENT DOCUMENTS

| | | |
|---|---|---|
| GB | 2082012 | 2/1982 |
| GB | 2092859 | 8/1982 |
| GB | 2128839 | 5/1984 |

* cited by examiner

*Primary Examiner*—Tu T. Nguyen
(74) *Attorney, Agent, or Firm*—Waddey & Patterson; Larry W. Brantley

(57) ABSTRACT

Apparatus and method for calibrating an incoherent fiber optic bundle for use in transmitting visual or infrared coherent images. The apparatus includes a computer, a computer video monitor, an objective lens adjacent to the input end of the bundle, a second lens adjacent the output end of the bundle, and a CCD camera. The camera transmits video data to the monitor to produce an illuminated fiber optic image. The coordinates for the center of each fiber is found through an imaging process and the output fibers coordinates are related to the input fiber coordinates and processed in the computer to produce a mapping lookup-table (LUT) unique to the specific fiber bundle. Remapping of the LUT due to changes in the lens focus, CCD camera, or the addition of an infrared filter is accomplished by a software utility in the computer.

10 Claims, 4 Drawing Sheets

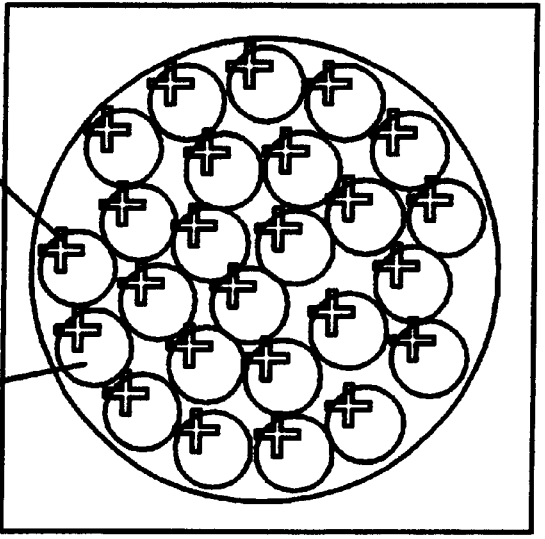

ROBUST INCOHERENT FIBER OPTIC BUNDLE DECODER

ORIGIN OF THE INVENTION

The invention described herein was made in the performance of work under a NASA contract, and it is subject to the provisions of Public Law 96-517 (U.S.C. 202) in which the Contractor has elected to retain title.

FIELD OF THE INVENTION

This invention relates to an apparatus and method for decoding and providing coherence for less expensive, incoherent fiber optic bundles. The apparatus and method provides a robust and inexpensive method and apparatus for transmitting visual or infrared coherent images.

BACKGROUND OF THE INVENTION

There are two types of fiber optic bundles: coherent and incoherent. Coherent fiber optic bundles are used to provide spatially intact representations of images. Because each fiber must have the same spatial position at the input and output faces, their manufacturing costs are much higher and thus more expensive. Incoherent fiber bundles, also called light guides, can be made in very long lengths because the fibers do not have to be spatially oriented in any specific manner.

A coherent imaging bundle must be manufactured very carefully in order to maintain the spatial orientation of the fibers at the input and output of the bundle. This is typically a build-up process involving gluing a single fiber layer together in a flat tape then building up layers of these tapes. The fiber placement at the ends is fixed by gluing and crimping a binding fitting. The ends are then ground and polished flat. This is a high cost process with inherent limitations on the size of bundles that are feasible and the temperature ranges which are limited by the glues.

The basic concept for imaging with incoherent fiber bundles requires that the spatial relation between each fiber input and output is precisely mapped for digital processing. The image formed on the input face of an incoherent bundle is a "scrambled" incoherent image at the output. The incoherent image is "unscrambled" by digitally remapping the output pixels to the correct location. Once a bundle has been mapped, the map becomes a property of the bundle which allows all input images to be resolved.

Thus, it should be apparent that due to lower costs and easier manufacturing it is advantageous to utilize incoherent fiber bundles for coherent image transmission.

U.K. patents 2,082,012; 2,092,859; and 2,128,883 and U.S. Pat. Nos. 5,327,514 and 5,515,470 are directed to methods and apparatus for calibrating fiber bundles for image transmission using a series of image patterns. U.S. Pat. Nos. 5,327,514 and 5,515,470 are specifically directed to coherent image transmission through incoherent fiber optic bundles. U.S. Pat. No. 5,327,514 discloses a method for calibrating an incoherent fiber bundle for image transmission using a series of image patterns. U.S. Pat. No. 5,515,470 discloses a method for reconstructing a coherent image given a set of known input and output fiber coordinates.

Although these prior inventions succeed in calibrating the fiber bundle and reconstructing the incoherent images, they do not address the sensitive nature of the bundle-specific calibration matrix which becomes void and unusable once any part of the fiber bundle to video camera interface is disturbed. For example, these prior inventions do not account for transmitting infrared images, because infrared wavelength images require different focusing than visible wavelength images. The incoherent-to-coherent calibration of the prior art does not allow refocusing of the optical interface since that would modify the coordinates of a fiber bundle's output fibers. Thus, the present invention provides not only a simpler approach to calibrating an incoherent fiber bundle but also a robust method for the end-user to switch video cameras, use alternative bundle-to-camera optical interfaces, or refocus the existing interfaces such as to transmit infrared wavelength images.

SUMMARY OF THE INVENTION

An object of the present invention is to provide apparatus and methods for decoding and providing coherence for incoherent fiber optic bundles.

It is another object of the present invention to provide apparatus and methods to produce a robust and inexpensive means for transmitting visual or infrared coherent images.

Still another object of the present invention is to provide a two-part means for using incoherent fiber optic bundles for visual or infrared image transmission where the calibration may be transformed to use different cameras or optical interfaces.

Yet another object of the present invention is to provide a two-part method of calibrating incoherent fiber optic bundles to transmit visual or infrared coherent images which consist of the following: 1) provide a fast and simple method for obtaining the coordinates of the fibers on the input and output face and how they relate to each other based on an initial camera and optical interface and 2) provide a method to allow the output fiber coordinates to be transformed for alternative cameras, optical interfaces, or the refocusing that is required when transmitting infrared images. Part 1 would be performed by the fiber bundle supplier using a simple hardware apparatus and software algorithms defined herein. Part 2 would be performed by the end-user using software algorithms along with the initial fiber coordinates and images as explained herein.

Part 1 to define the initial coordinates of the input and output fibers is achieved by an apparatus having the following characteristic features. A computer monitor is mounted on a lab bench with the screen orthogonal to the input face of the fiber optic bundle and attached objective lens. The output face of the fiber optic bundle is coupled with a charge-coupled device (CCD) video camera with a focusing lens between them. The video camera-signal is digitized into still images using a video frame grabber board.

Part 2 to transform the coordinates of the fibers on the output face of the bundle for different configurations is achieved by an apparatus similar to that in Part 1 except the video monitor and the input face of the fiber optic bundle no longer face each other.

BRIEF DESCRIPTION OF THE DRAWINGS

FIG. 5a illustrates the image processor's software user interface for transforming the previously calculated set of output fiber center centroid coordinates to a new set due to modifications to the fiber bundle's output optical surface.

FIG. 5b illustrates the misalignment problem between the actual optical fiber centroids and the calculated centroids due to modifications to the fiber bundle's output optical interface.

DESCRIPTION OF THE PREFERRED EMBODIMENTS

Figure 1:
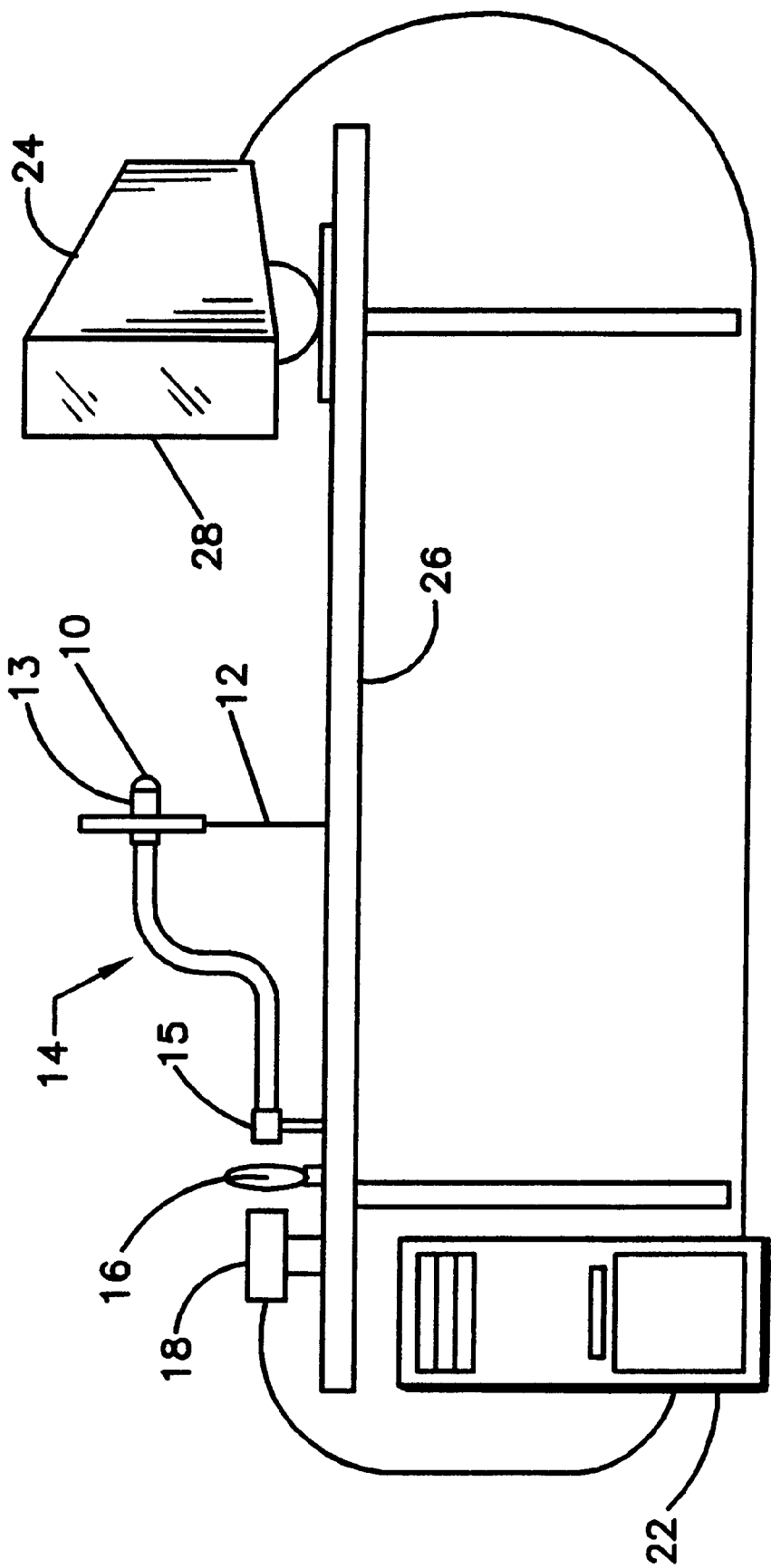
FIG. 1 is a diagrammatic view of the fiber optic bundle decoder apparatus for calibrating an incoherent fiber optic bundle.

FIG. 1 is a diagrammatic view of the apparatus which is used in Part 1 for the initial incoherent fiber bundle calibration. The primary goal of Part 1 is to identify the coordinates of the fibers on the output face and then relate their coordinates to the input face. To achieve this goal, the apparatus of FIG. 1 is shown to include an optical workbench 26 for supporting a fiber optic bundle 14 on a mount 12 which is supported on bench 26. A video monitor 24 is also supported on bench 26. The fiber optic bundle is shown to have an input end 13 and an output end 15. An objective lens 10 is mounted adjacent input end 13 and a second lens 16 is mounted adjacent output end 15 of the fiber optic bundle 14.

Figure 2:
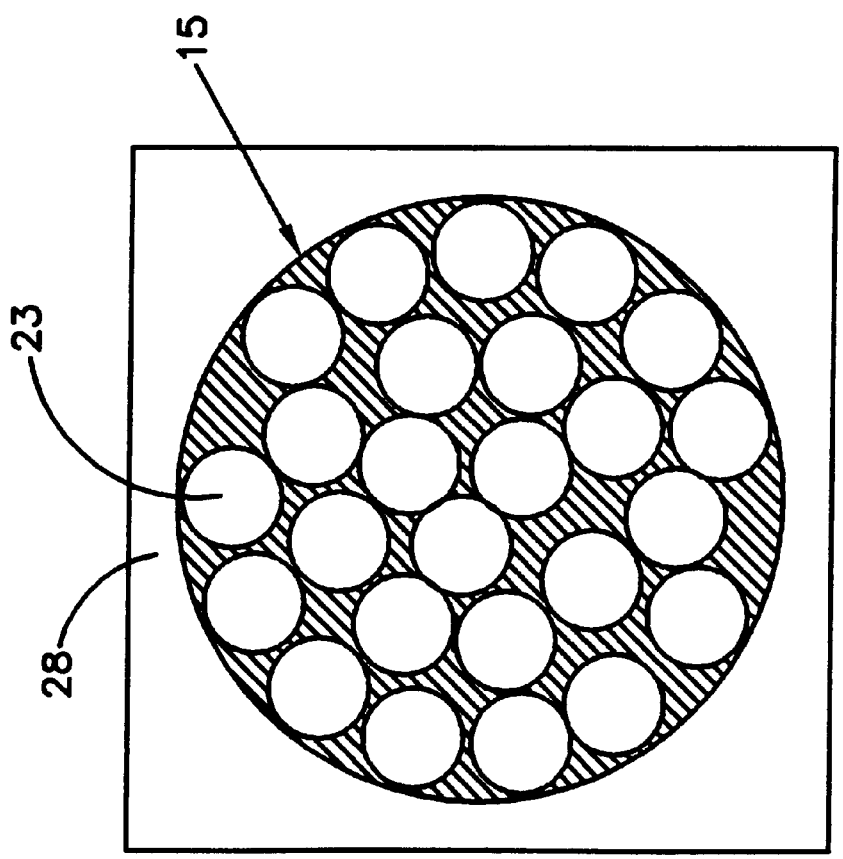
FIG. 2 is an end view of the fiber optic and illustrates the coordinates of the output fiber centers.

A charged coupled device camera 18 is supported adjacent to lens 16 to provide a video signal to a computer 22 having a frame grabber configured therein. To determine the fiber coordinates on the output face 15, the video monitor 24 displays a solid white screen 28. Computer 22 captures the video frame of this screen 28 from the fiber optic bundle 14 which is focused orthogonal to the screen which results in an image such as FIG. 2 which illustrates the output fiber optics 23 raw image. Since all fiber optic bundles have cladding around each individual fiber, only the circular fibers themselves will be illuminated. Thus the coordinate for the center of each fiber is found through a unique image processing algorithm consisting of the following steps:

1) Posterize—resets the intensity of each pixel below the minimum threshold or above the maximum threshold to black or white, respectively,
2) Erode—removes the border pixels of each fiber to shrink their diameters,
3) Binary—converts the image to black and white,
4) Reconstruct—compensates for speckle effects from erode and binary,
5) Dump-Singles—removes isolated pixels from fiber centroid image,
6) Border—sets the outside border pixels of fiber to black and white,
7) Center—calculates the coordinates for the center of a rectangle that would enclose each remaining set of white fiber pixels.

Figure 3:
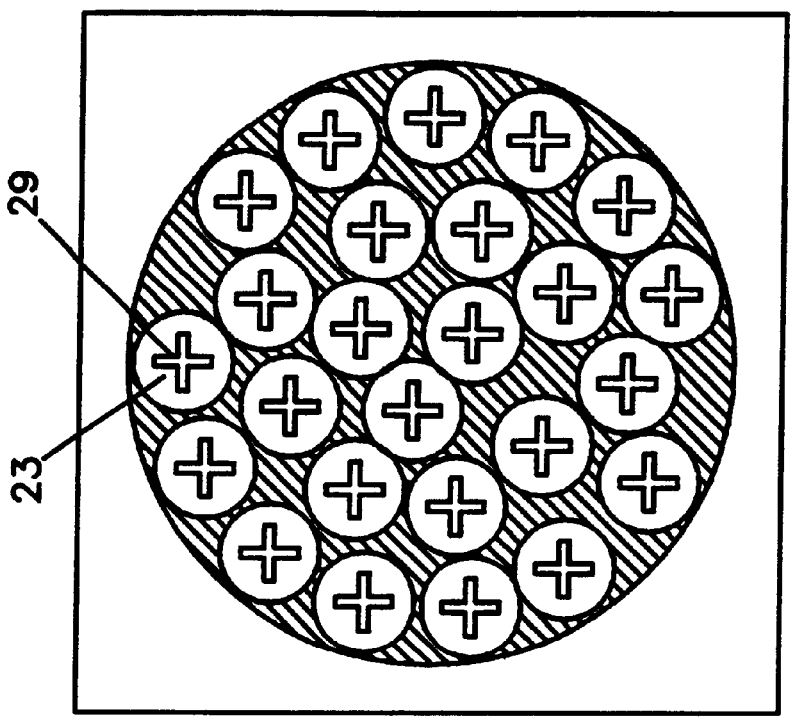
FIG. 3 is a view similar to FIG. 2 with the centroids of each fiber overlaid on the output bundle face image.

After the seven sequential image processing steps have completed, the result is a set of coordinates to the center of each fiber 23 of output face 15 that was detected. Since fiber optic bundles typically contain a few defective fibers, not all fiber centers can be detected. In most cases, it is sufficient for only a majority of the fibers to be detected. FIG. 3 shows a white cross 29 for each fiber center 23 detected overlaid on top of the original fiber bundle output face image. The degree of success from the fiber center detection is easily seen from this overlay display and once a large percentage of output fiber centers have been detected their coordinates are recorded for later use.

Figure 4:
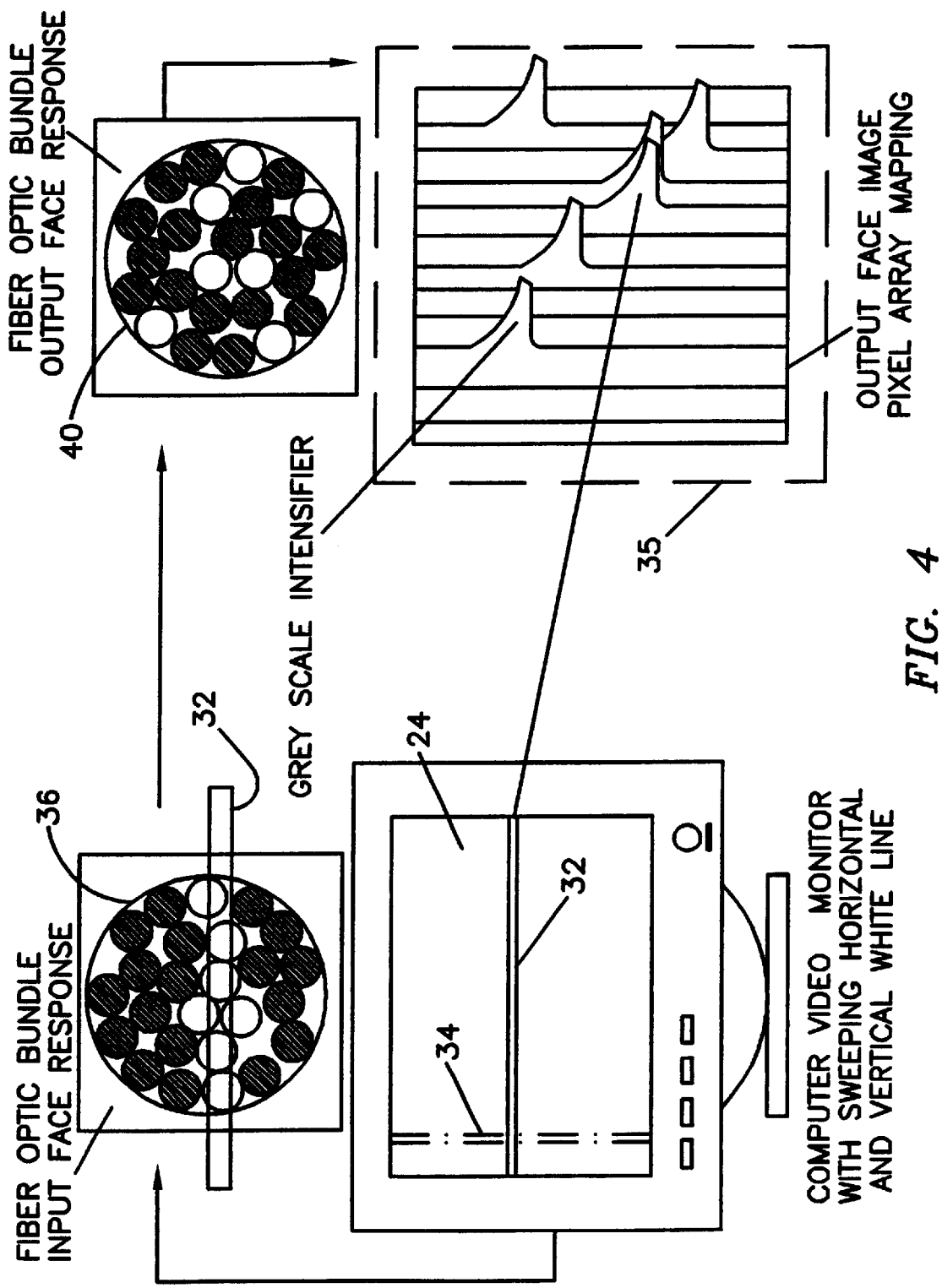
FIG. 4 is a diagrammatic view illustrating the process used by the image processor to calibrate the input and output fiber coordinates through a horizontal and vertical sweep of a white line across the face of the video monitor.

The next step is to relate the output fiber coordinates to the input fiber coordinates. FIG. 4 shows the process used by the image processor to calibrate the input and output fiber coordinates through a horizontal and vertical white line sweep using the same apparatus setup. The horizontal white line is indicated by the numeral 32 and the vertical white line is indicated by the numeral 34 (shown in dot-dash) since the lines are not simultaneously generated. Numeral 36 indicates the fiber bundle input face in response to the horizontal and vertical white line sweep. Numeral 40 indicates the fiber bundle output face response to the vertical and horizontal line sweep. A software algorithm controls the horizontal and vertical white line position. Before the line is moved to the next pixel row or column, the image is captured from the image capture board of computer 22 in FIG. 1. From each image, the illuminated output face pixels and their intensity values are recorded with respect to the position of the horizontal or vertical line. Based on the recorded data, it is determined which horizontal and vertical line positions result in the maximum illumination intensity for each output fiber centroid previously recorded. Horizontal and vertical line positions are converted into input fiber coordinates based on the maximum and minimum pixel coordinates of the output fiber centroids. Thus a mapping look-up-table (LUT) unique to a specific fiber bundle is determined from the coordinates of the output and input bundle faces.

Part 2 is concerned with the remapping (or transformation) of the bundle unique LUT due to disturbances or changes in the lens focus, CCD camera, or addition of infrared filter. Part 2 can be performed in a straightforward manner by the end-user of the fiber optic bundle using software algorithms and the initially generated fiber center LUT. There are two major motivations for such a remapping process: 1) to transmit infrared images coherently using an incoherent fiber bundle and 2) to allow an alternative CCD camera to be used.

In order to transmit coherent infrared images, a fiber center LUT is required for the incoherent fiber bundle. However, the LUT is generated from the visible wavelength illumination of the computer video monitor 24 of FIG. 1. Infrared images require a different focus than visible images. To limit transmission to only infrared, an infrared filter (not shown) is positioned between the lens 16 and CCD camera 18 of FIG. 1. Inserting the infrared filter also changes the focus. Thus, the focus must be reestablished and the LUT must then be remapped so that the corresponding input and output fiber centers are properly calibrated with each other.

If an alternative CCD camera is used, this will inherently disturb the spatial positioning of the output fibers with respect to the resulting images. Thus, as with transmitting infrared, the fiber center LUT must be remapped so that the input and output fiber centers are properly calibrated with each other.

FIG. 5a also illustrates a software utility developed for remapping the fiber centers LUT. The remapping procedure consists of a combination of shift, rotation, and translation of the original LUT output coordinates to match the current fiber center positions resulting from the modified optics or CCD camera apparatus. In order to compute a preliminary estimate of the output fiber center transformation, the end-user is required to identify four distinct reference pints (fiducials) on both an image corresponding to the original LUT and an image that will correspond to the new LUT. These images are easily obtained by simple illumination of the fiber bundle input face. The original LUT image would be generated at the same time as the original LUT itself. The image corresponding to the new LUT would be generated once the fiber optics and CCD camera interface having been securely mounted. Once the four corresponding fiducial points are identified on both the original and new LUT images, the software computes the preliminary transformation coefficients and displays the new fiber centroid coordinates 50 needing alignment remapping overlaid on the raw image of output fibers indicated by the numeral 40 in FIG. 5b. The transformation coefficients 54 (FIG. 5a) can be modified and the changes previewed on the LUT overlay image. When the fiber centers 50 (FIG. 5b) appear to properly overlay the output fibers 40 in the image, then the remapping is complete and a new fiber center LUT is generated based on the transformation coefficients 54 illustrated in FIG. 5a.

Thus, although there have been described particular embodiments of the present invention of a new and useful ROBUST INCOHERENT FIBER OPTIC BUNDLE DECODER, it is not intended that such references be construed as limitations upon the scope of this invention except as set forth in the following claims.

What is claimed is:

1. Apparatus for calibrating an incoherent fiber optic bundle for producing coherent images comprising:
    a support for supporting the incoherent fiber optic bundle having an input and an output end;
    an objective lens mounted adjacent to said input end of said fiber optic bundle;
    a second lens mounted adjacent to said output end of said fiber optic bundle;
    a charged coupled device (CCD) camera mounted adjacent said second lens and disposed for generating video image signals relating to the image on said output end of said bundle;
    a computer having a digitizing frame grabber video capture board to extract predetermined frames of said video image signals;
    a video computer monitor disposed in spaced orthogonal relation with said fiber optic bundle and electrically connected with said frame grabber to receive video signals therefrom and to provide an image of the output ends of the fibers in the fiber optic bundle; and
    wherein the computer is operable to cause the monitor to illuminate the input end of the fiber optic bundle by sweeping a white line vertically and horizontally across the monitor, and the computer is further operable to record a plurality of images of the output end of the fiber optic bundle as the white line moves across the input end of the fiber optic bundle.

2. Apparatus as in claim 1 including an infrared filter mounted between said second lens and said CCD camera.

3. A method of calibrating an incoherent fiber optic bundle for producing coherent images therefrom including the steps of:
    positioning the screen of a video monitor in orthogonal relation with the input end of said fiber optic bundle;
    illuminating said fiber optic bundle by sweeping said input end with white vertical and horizontal sweeps to produce an image of the output end of said fiber optic bundle on said screen;
    obtaining a set of coordinates corresponding to the center of each output fiber of the fiber optic bundle;
    acquiring an image of the output fibers of the fiber optic bundle with the input fibers focused on the illuminated screen; and
    producing the coordinate for the center of each output fiber from the acquired image by:
        1) resetting the intensity of each pixel below a minimum threshold or above a maximum threshold in the image to black or white, respectively;
        2) removing the border pixels in each output fiber to shrink their diameters;
        3) converting the image to black and white;
        4) compensating for speckle effects from steps 2 and 3;
        5) removing isolated pixels from fiber centroid image;
        6) setting the outside border pixels of said output fibers to black and white; and
        7) calculating the coordinates for the center of a rectangle which would enclose each remaining set of illuminate fiber pixels.

4. The method as in claim 3 including the step of consecutively sweeping a horizontal white line and a vertical white line across said computer video monitor to illuminate the input and output ends of the fibers in the fiber optic bundle.

5. The method as in claim 4 wherein said illuminated fibers and the intensity values of the corresponding output ends of the fibers are recorded with respect to the position of said white illuminated horizontal or vertical line on said video monitor screen.

6. The method as in claim 5 including the step of determining which of said horizontal and vertical white line positions result in the maximum illumination intensity of each output fiber centroid in order to generate a look-up-table.

7. The method as in claim 6 including the step of generating said look-up-table for mapping the pixel illumination between said output and input ends of the fibers.

8. The method as in claim 7 including the step of transforming the initial output fiber mapping look-up-table to account for lens focus changes, different CCD cameras, or the addition of infrared filters.

9. The method as in claim 8 including the step of identifying four reference points on both an image corresponding to the initial lookup table and an image corresponding to the transformed lookup table.

10. The method as in claim 9 including the step of obtaining a set of transformation coefficients which are calculated and used to generate a new output fiber mapping look-up table.

* * * * *